United States Patent [19]

Morooka

[11] Patent Number: 5,628,673
[45] Date of Patent: May 13, 1997

[54] DICING MACHINE WITH NON-CONTACT SETUP FUNCTION

[75] Inventor: Masaya Morooka, Narashino, Japan

[73] Assignee: Seiko Seiki Kabushiki Kaisha, Japan

[21] Appl. No.: 341,514

[22] Filed: Nov. 17, 1994

[30] Foreign Application Priority Data

Nov. 26, 1993 [JP] Japan ................... 5-321202
Nov. 26, 1993 [JP] Japan ................... 5-321204

[51] Int. Cl.⁶ ........................................... B24B 49/10
[52] U.S. Cl. ................... 451/9; 451/10; 451/11; 451/12; 125/13.01; 125/13.02
[58] Field of Search ......................... 451/9, 10, 11, 451/12, 14, 24, 26; 125/13.01, 13.02

[56] References Cited

U.S. PATENT DOCUMENTS

| | | | |
|---|---|---|---|
| 3,829,750 | 8/1974 | Centner et al. | 318/561 |
| 3,905,161 | 9/1975 | Tomita et al. | 451/9 |
| 5,174,270 | 12/1992 | Katayama et al. | 125/13.02 |
| 5,184,428 | 2/1993 | Feldt et al. | 451/9 |
| 5,237,779 | 8/1993 | Ota | 451/10 |
| 5,245,759 | 9/1993 | Pearson | 451/9 |
| 5,335,454 | 8/1994 | Ilek et al. | 451/9 |
| 5,458,526 | 10/1995 | Tsukada et al. | 451/41 |

*Primary Examiner*—Willis Little
*Assistant Examiner*—Eileen Morgan
*Attorney, Agent, or Firm*—Adams & Wilks

[57] ABSTRACT

A dicing machine comprises a work table having a surface for supporting a workpiece and a processing element for processing the workpiece. A gap detection device detects a preselected gap between the processing element and the surface of the work table. A control device moves the processing element and the gap detection device and detects their positions. A non-contact detection device detects a non-contact condition of the gap detection device and a processing portion of the processing element. A calculating device calculates a processing position of the workpiece in accordance with the positions of the processing element and the gap detection device detected by the control device when the preselected gap between the processing element and the surface of the work table is detected by the gap detection device, and when the non-contact condition of the gap detection device and the processing portion of the processing element is detected by the non-contact detection device.

25 Claims, 16 Drawing Sheets

F I G . 1
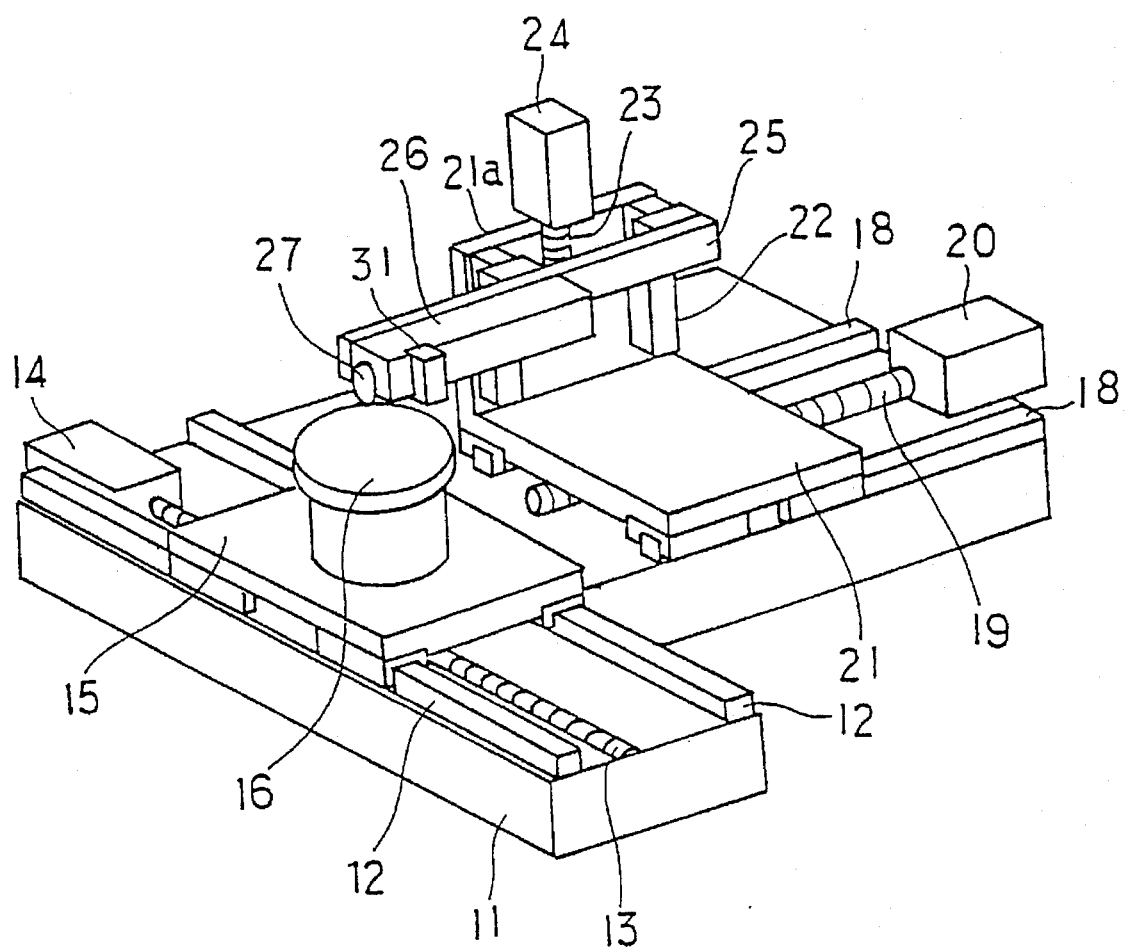

DICING MACHINE WITH NON-CONTACT SETUP FUNCTION

BACKGROUND OF THE INVENTION

The present invention relates to a dicing machine for cutting a semiconductor wafer and, more particularly, to a dicing machine having means for setting a cutting position of a semiconductor wafer.

Where a semiconductor wafer is cut by a dicing machine, it is necessary to maintain constant the infeed depth into semiconductor wafers formed by a cutting blade in order to maintain the machining quality constant.

Accordingly, in the prior art techniques, a given reference position has been established, as described, for example, in Utility Model Laid-Open No. 118609/1991. A position spaced a given distance from this reference position is taken as an infeed position. In the reference position, the cutting edge of the blade is detected when not in contact. The blade is moved a certain distance from this reference position. In this way, the edge of the blade is placed in the infeed position.

In the above-cited bulletin, the edge of the blade is placed in a position Hi where a groove is formed by a machining operation. This position Hi is detected. Also, the position H2 of the edge of the blade is detected by an optical detection means installed in the reference position. The edge of the blade is placed in a position that is given by adding (H1–H2) to H2.

In the prior art techniques, the position H1 at which the groove is formed is at a given height above the machining table and so it has been necessary to bring the blade into contact with the machining table at least once to find the H1–H2).

When either the machining table or the optical detection means is subjected to maintenance, the value of the (H1–H2) varies. Therefore, in order to find this, it is necessary to bring the blade into contact with the machining table.

In this way, in the prior art method, the blade is brought into contact with the machining table and so the blade is damaged. As a result, the life of the blade is shortened. Also, the semiconductor wafer is chipped, thus deteriorating its quality.

SUMMARY OF THE INVENTION

It is an object of the present invention to provide a dicing machine that can establish an infeed position of a semiconductor wafer without bringing the blade into contact with the machining table.

The above object is achieved in accordance with the teachings of the invention by a dicing machine with non-contact setup function comprising: a machining table for holding a semiconductor wafer, a cutting blade for cutting the semiconductor wafer held to the machining table, gap detection means for detecting a gap between the cutting blade and an upper surface of the machining table to be in a predetermined value, position controlling means for moving the cutting blade, the gap detection means in a body in a vertical direction, and for recognizing their positions, non-contact detection means for detecting the gap detection means and a cutting edge of the cutting blade in a condition of non-contact, the non-contact detection means being placed at a standard position for determining the cutting blade position at a cutting position of the semiconductor wafer, and arithmetic operation means for calculating the cutting position of the semiconductor wafer in accordance with a position recognized by the position controlling means when a predetermined gap between the cutting blade and the upper surface of the machining table is detected by the gap detection means, and also from positions recognized by the position controlling means when the gap detection means and the cutting edge of the cutting blade are detected by the non-contact detection means.

Where, the gap detection means comprises: a machining table reference surface having a given positional relation with the surface of the machining table, a contact piece having a given positional relation with the cutting edge of the cutting blade, and a contact detection means for detecting contact between the machining table reference surface and the contact piece, wherein the arithmetic operation means calculates the cutting position from a position recognized by the position control means when the contact detection means detects contact between the machining table reference surface and the contact piece, and also from positions recognized by the position control means when the non-contact detection means detects the contact piece and the cutting edge of the cutting blade.

Also, the gap detection means comprises: a contact switch which is used for detecting its contact with the machining table, and a detection piece positioned in a predetermined relationship with the contact switch and the edge of the cutting blade, wherein the arithmetic operation means calculates the cutting position from a position recognized by the position control means when the contact switch detects a predetermined gap between the cutting edge of the cutting blade and the surface of the machining table, and also from positions recognized by the position control means when the non-contact detection means detects the detection piece and the cutting edge of the cutting blade.

Further, an end surface of the contact piece is formed so as to have the same curvature as an outer periphery of the cutting blade.

Also, an end surface of the detection piece is formed so as to have the same curvature as an outer periphery of the cutting blade.

In the novel dicing machine, the gap detection means detects a predetermined gap between the cutting blade and the surface of the machining table. The position assumed by the gap detection means at this time is recognized by the position control means. The non-contact detection means detects the gap detection means and the cutting edge of the cutting blade when they are not in contact with the surface of the machining table. The positions assumed by the gap detection means and the cutting blade, respectively, at this time are recognized by the position control means. The arithmetic operation means calculates the cutting position from the positions recognized by the position control means.

More precisely, a contact detection means detects contact between the machining table reference surface and the contact piece both of which the gap detection means comprises. The position assumed by the contact piece at this time is recognized by the position control means. The non-contact detection means detects the contact piece and the cutting edge of the cutting blade in a condition of non-contact. The positions assumed by the contact piece and the cutting blade, respectively, at this time are recognized by the position control means. The arithmetic operation means calculates the cutting position from the positions recognized by the position control means when the contact detection means detects contact between the contact piece and the machining table reference surface, and also from the positions recognized by the position control means when the non-contact detection means the contact piece and the cutting edge of the cutting blade.

Another structure of the gap detection means consists of the contact switch and the detection piece which is in a predetermined relative position with the cutting edge of the cutting blade. In this structure, the arithmetic operation means calculates the cutting position from the positions recognized by the position control means when the contact switch detects a predetermined gap between the cutting blade and the surface of the machining table, and also from the positions recognized by the position control means when the non-contact detection means detects the detection piece and the cutting edge of the cutting blade.

Furthermore, the end surface of the contact piece or the detection piece is formed so as to have the same curvature as an outer periphery of the cutting blade. By this construction, the precise positions can be detected even though a relative deflection occurs between the rotation axis of the cutting blade and the detection axis of the non-contact detection means.

BRIEF DESCRIPTION OF THE DRAWINGS

FIG. 1 is a perspective view showing the structure of main portions of a dicing machine according to the first embodiment of the present invention;

DETAILED DESCRIPTION OF THE PREFERRED EMBODIMENTS

Figure 2:
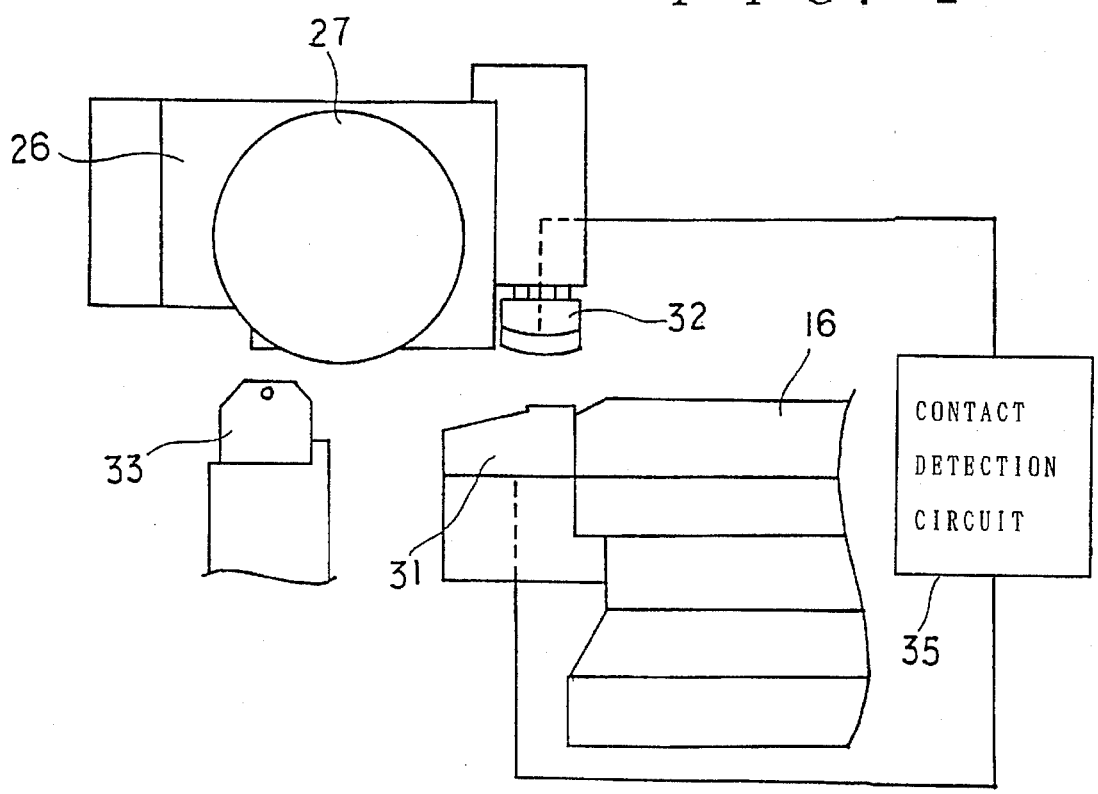
FIG. 2 is a side elevation showing a blade, a setup piece, a sub-set piece, and a non-contact setup sensor which are shown in FIG. 1.

Embodiments of a dicing machine according to the present invention are hereinafter described in detail with reference to FIGS. 1–18.

FIG. 1 is a perspective view showing the structure of main portions of a dicing machine according to the first embodiment of the present invention.

As shown in this figure, the dicing machine according to the present embodiment comprises a base 11, guide rails 12 mounted on the base 11, a ball screw 13 mounted parallel to the guide rails 12 on the base 11, an electric motor 14 for rotating the ball screw 13, a moving table 15 in mesh with the ball screw 13 and moving along the guide rails 12, and a chuck table 16 acting as a machining table to which a semiconductor wafer is held. The table 16 is mounted on the moving table 15.

The dicing machine is further equipped with guide rails 18, a ball screw 19, an electric motor 20 for rotating the ball screw 19, and a moving table 21 in mesh with the ball screw 19 and moving along the guide rails 18, which are mounted perpendicular to the guide rails 12 on the base 11. The ball screw 19 is mounted parallel to the guide rails 18 on the base 11. The moving table 21 has a vertical wall surface 21a.

The dicing machine is further equipped with guide rails 22 formed on this wall surface 21a, a ball screw 23 mounted parallel to the guide rails 22, an electric motor 24 for rotating the ball screw 23, and an infeed shaft 25 in mesh with the ball screw 23 and moving along the guide rails 22. A spindle 26 is attached to the infeed shaft 25. A blade 27 is mounted to the output shaft of this spindle 26.

As shown in FIG. 2, in the dicing machine according to the present embodiment, a sub-setup table 31 acting as a machining table reference surface having a given positional relation with the top surface of the chuck table 16 is mounted to this table 16. A setup piece 32 acting as a contact piece having a given positional relation with the cutting edge of the blade 27 is mounted to the side of the spindle 26.

The end surface of this setup piece 32 is formed so as to have the same curvature as the outer periphery of the blade 27. In the present embodiment, the top surface of the sub-setup table 31 is positioned slightly under the top surface of the chuck table 16. The bottom surface of the setup piece 32 is placed slightly above the cutting edge of the blade 27.

At least the top surface of the sub-setup table 31 and at least the bottom surface of the setup piece 32 are made of a metal or metals. They are connected with a contact detection circuit 35. This contact detection circuit 35 applies a voltage between the top surface of the sub-setup table 31 and the bottom surface of the setup piece 32. The contact between the sub-setup table 31 and the setup piece 32 is detected by detecting electrical conduction between them.

A non-contact setup sensor 33 acting as a non-contact detection means is mounted close to the chuck table 16 in a reference position at which the blade 27 is placed in an infeed position of a semiconductor wafer. The non-contact detection means detects the contact piece 32 and the cutting edge of the blade 27 when they are not in contact with each other.

Figure 3:
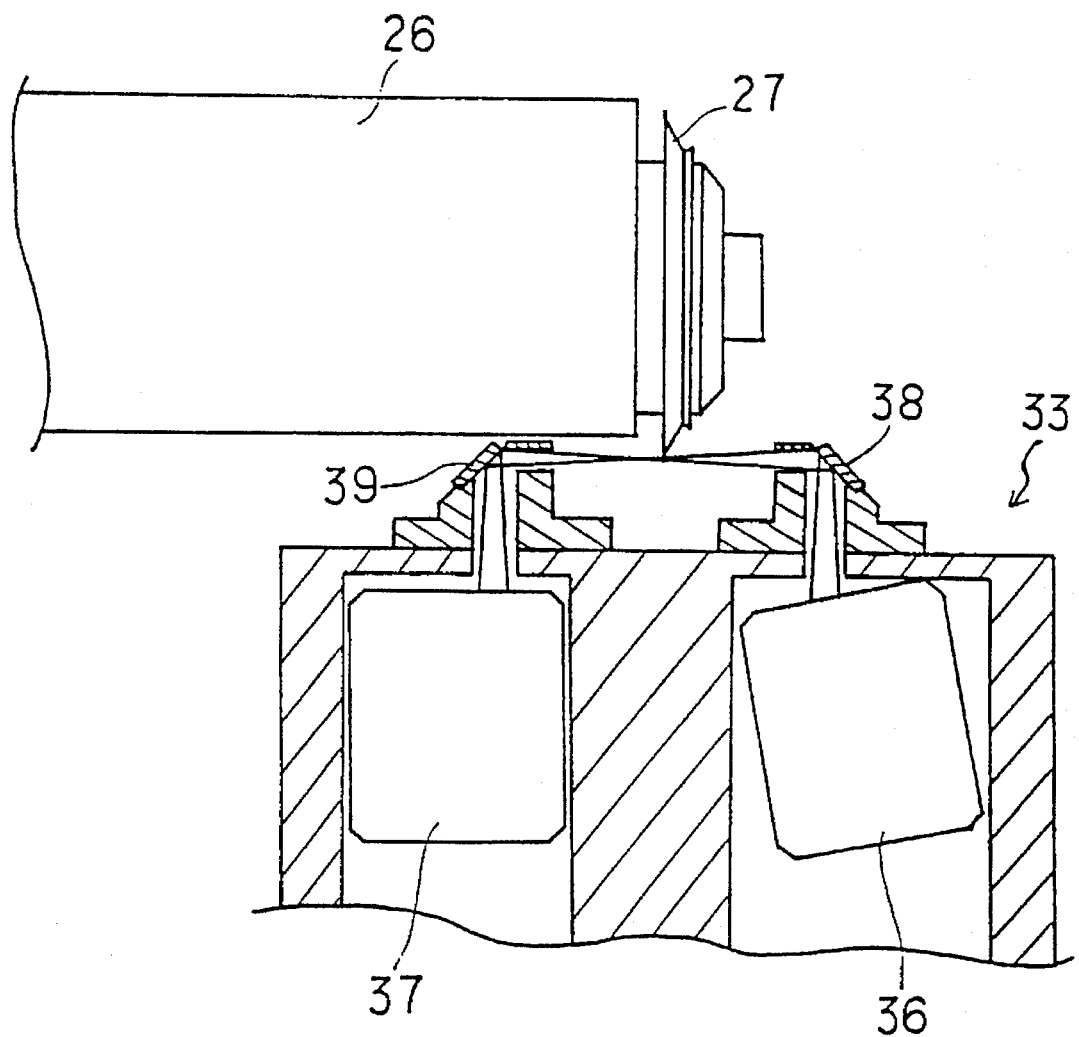
FIG. 3 is cross-sectional view showing the structure of the non-contact setup sensor in the present invention.

FIG. 3 is a cross-sectional view showing the structure of the non-contact setup sensor 33. As shown in this figure, the non-contact setup sensor 33 comprises a projector portion 36 for projecting collimated light, a light-receiving portion 37, and mirrors 38, 39 for guiding light emitted from the projector portion 36 to the light-receiving portion 37.

The light projected from the projector portion 36 converges in a position located midway between the mirrors 38 and 39. The blade 27 crosses this converging position. The non-contact setup sensor 33 detects the cutting blade 27 from a variation in the amount of light received by the light-receiving portion 37.

Figure 4:
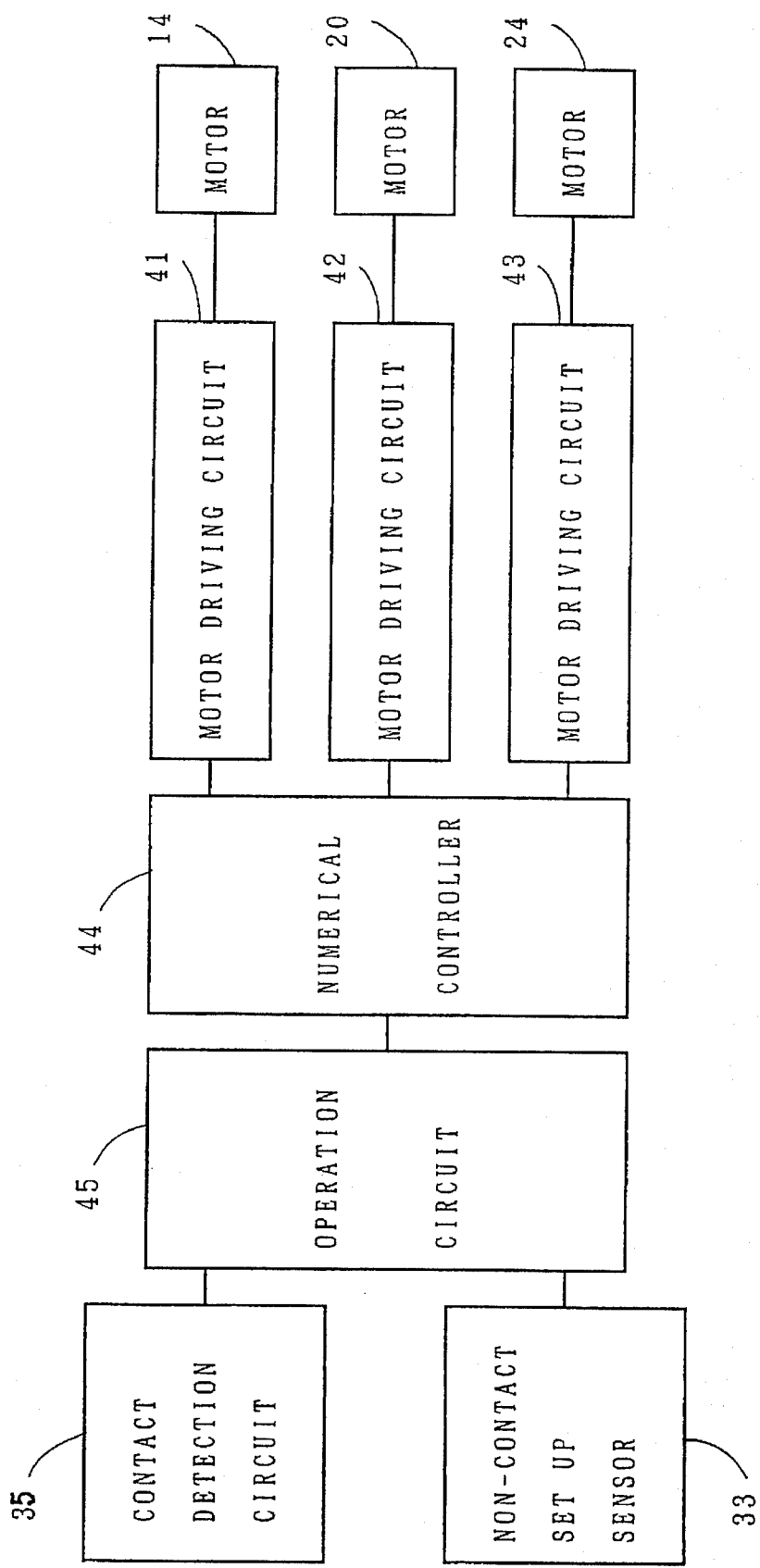
FIG. 4 is a block diagram showing the control system of a dicing machine according to the first embodiment of the present invention.

FIG. 4 is a block diagram showing the structure of the control system of the dicing machine according to the present embodiment.

As shown in this figure, the dicing machine in the present embodiment comprises motor driving circuits 41, 42, and 43 for driving the electric motors 14, 20, and 24, respectively, a numerical controller 44 for controlling the motor driving circuits 41–43 so as to move the chuck table 16 and the blade 27 and for recognizing their positions, and an arithmetic operation circuit 45 for calculating an infeed position.

The operation circuit 45 calculates the infeed position from the position of the blade 27 recognized by the numerical controller 44 when the contact detection circuit 35 detects contact between the sub-setup table 31 and the setup piece 32 and also from the positions of the setup piece 32 and the blade 27 recognized by the numerical controller 44 when the non-contact setup sensor 33 detects the setup piece 32 and the cutting edge of the cutting blade 27.

An operation of the dicing machine in the present embodiment for setting an infeed position of a semiconductor wafer is described below.

Figure 5:
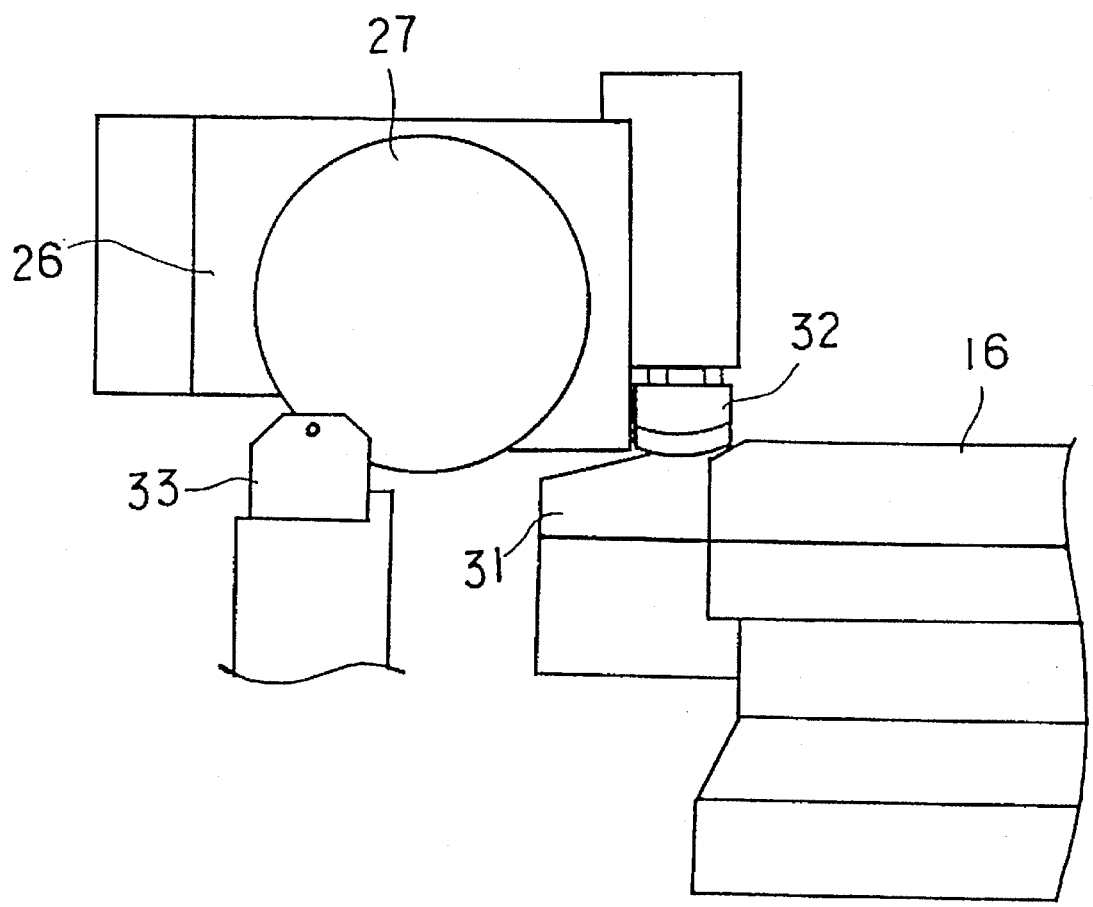
FIG. 5 is a side elevation, illustrating an operation for detecting contact between the setup piece and the sub-setup table in the dicing machine according to the first embodiment of the present invention.

First, as shown in FIG. 5, the numerical controller 44 drives the motor 24 via the motor driving circuit 43 to gradually lower the setup piece 32 from above the sub-setup table 31. The contact detection circuit 35 detects contact between the setup piece 32 and the sub-setup table 31. The position assumed by the setup piece 32 at this time is recognized by the numerical controller 44.

Figure 6:
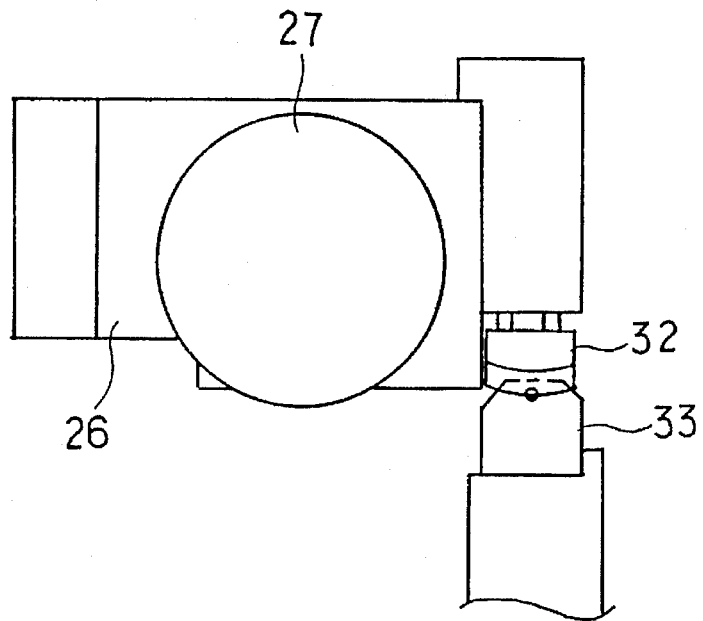
FIG. 6 is a side elevation, illustrating an operation for detecting the lower end portion of the setup piece by the non-contact setup sensor in the dicing machine according to the first embodiment of the present invention.

Then, as shown in FIG. 6, the setup piece 32 is gradually lowered from above the non-contact setup sensor 33. The non-contact setup sensor 33 detects the lower end portion of the setup piece 32. The position assumed by the setup piece 32 at this time is recognized by the numerical controller 44.

Figure 7:
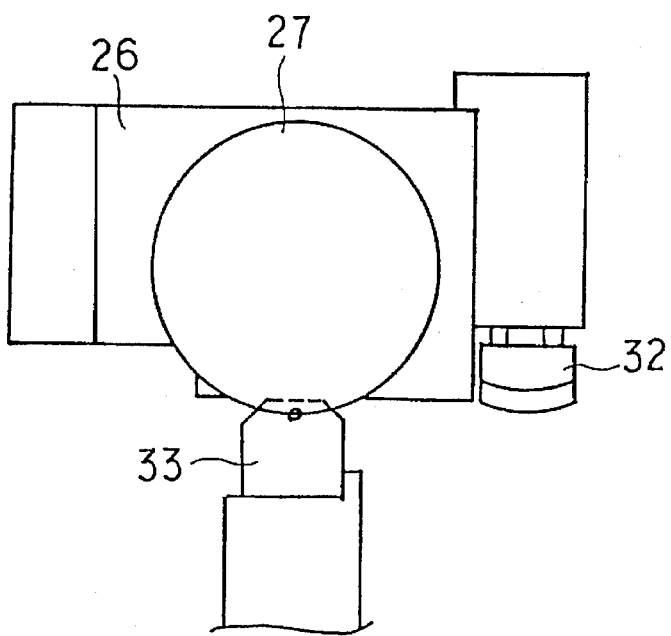
FIG. 7 is a side elevation, illustrating an operation for detecting the cutting edge of the blade by the non-contact setup sensor in the dicing machine according to the first embodiment of the present invention.

Then, as shown in FIG. 7, the blade 27 is gradually lowered from above the non-contact setup sensor 33. The non-contact setup sensor 33 detects the cutting edge of the blade 27. The position assumed by the blade 27 at this time is recognized by the numerical controller 44.

The operation circuit 45 computes the infeed position from the positions recognized by the numerical controller 44 in the operation described above.

The method of calculating the infeed position is described below by referring to FIGS. 8 and 9. In the description made below, it is assumed for simplicity that the surface of the chuck table 16. If the top surface of the sub-setup table 31 is not flush with the top surface of the chuck table 16 as in the illustrated embodiment, the level gap between them is known in advance. Therefore, a correction should be made for the level gap.

Figure 8:
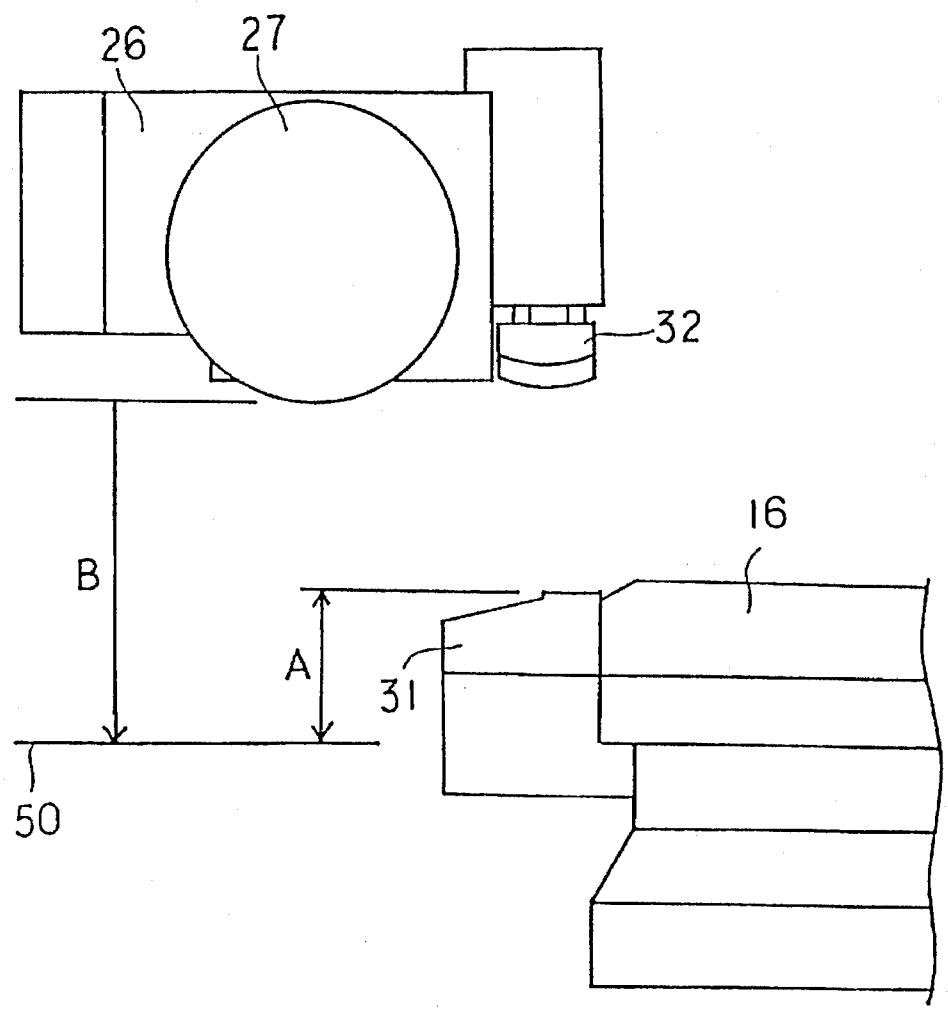
FIG. 8 is a side elevation, illustrating a method of calculating a cutting position in the dicing machine according to the first embodiment of the present invention.

First, as shown in FIG. 8, the level gap A between the top surface of the sub-setup table 31, or the top surface of the chuck table 16, and a reference position 50 is measured from the position of the setup piece 32 assumed when the setup piece 32 and the sub-setup table 31 are in contact with each other and also from the position of the setup piece 32 assumed when the non-contact setup sensor 33 in the reference position 50 detects the lower end portion of the setup piece 32. Then, the position B of the blade 27 assumed when its cutting edge is detected by the non-contact setup sensor 33 is measured.

Figure 9:
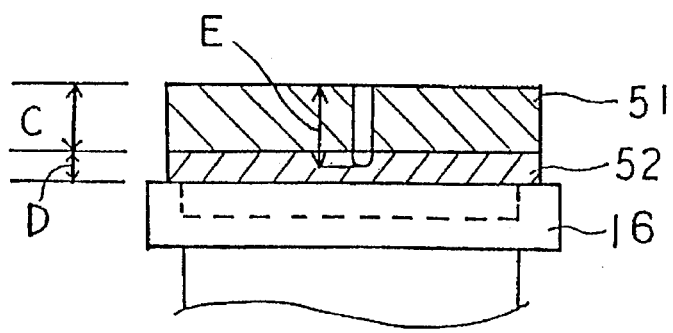
FIG. 9 is a cross-sectional view, illustrating a method of calculating a cutting position in the dicing machine according tot first embodiment of the present invention.

As shown in FIG. 9, let C be the thickness of a semiconductor wafer 51. Let D be the thickness of tape 52 for securing the semiconductor wafer 51 to a carrier frame. Let E be the amount of infeed into the tape 52 as measured from the upper end surface of the semiconductor wafer 51.

The infeed position T is given by the following equation.

$$T=(B-A)-(C+D)+E$$

As described thus far, in the present embodiment, the position at which the semiconductor wafer can be fed in can be set without permitting the blade 27 to contact the chuck table 16 at all by the provision of the setup piece 32 and the sub-setup table 31. Consequently, the blade 27 is prevented from getting damaged. As a result, the lifetime of the blade 27 can be lengthened. Also, the semiconductor wafer is prevented from being chipped. Thus, the quality is improved.

In the above first embodiment, for example, if the chuck table 16 is not made of a non-conducting material such as a ceramic but made of metal, contact between the setup piece 32 and the chuck table 16 may be detected, using the chuck table 16 as a machining table reference surface, without providing the sub-setup table 31.

The cutting edge of the blade 27 has unevenness formed by diamond grains. On the other hand, the end portion of the setup piece 32 is not uneven. Furthermore, the blade 27 is rotated, while the setup piece 32 is fixed. Therefore, there is a possibility that the position at which the non-contact setup sensor 33 recognizes the end portion of the blade 27 or the cutting edge of the blade 27 differs slightly, depending on whether the end portion of the setup piece 32 or the cutting edge of the blade 27 is detected by the non-contact setup sensor 33. Accordingly, the following procedure may be adopted. Experiments are previously performed to measure the position at which the non-contact setup sensor 33 recognizes the end portion of the setup piece 32 or the cutting edge of the blade 27. The difference with the actual position of either the end portion of the setup piece 32 or the cutting edge of the blade 27 is found. When the dicing machine is used in practice, a correction is made.

In the above first embodiment, in order to feed the blade into the semiconductor wafer, the blade 27 is designed to be moved vertically by the ball screw 23 and the motor 24. Concomitantly, the setup piece 32 is moved also vertically. The present invention is not limited to this scheme. For instance, as the second embodiment shown in FIG. 10, the blade may be fed into the wafer vertically by making a rotation about a given axis.

Figure 10:
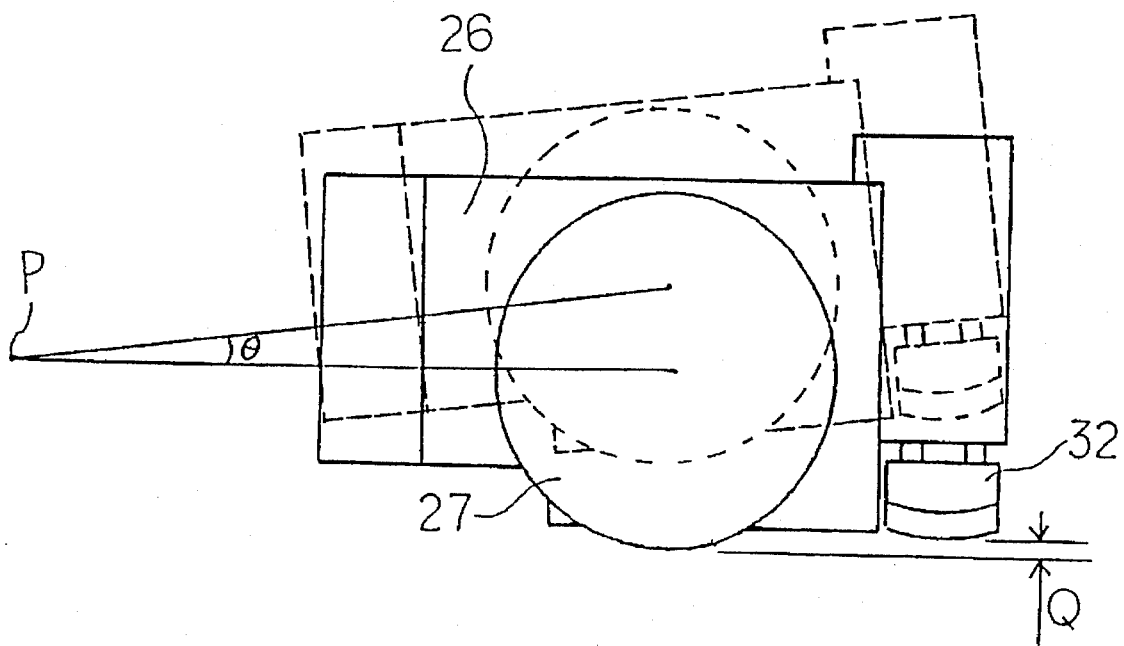
FIG. 10 is a side elevation, illustrating the manner in which a blade is fed in about a given axis of rotation in a second embodiment of the present invention.

FIG. 10 shows the state in which the infeed of the blade 27 is made about the given axis. As shown in this figure, the spindle 26 to which the blade 27 and the setup piece 32 are rigidly mounted is moved as a unit vertically about an axis of rotation P.

In this embodiment, the numerical controller 44 recognizes the position at which the setup piece 32 contacts the sub-setup table 31, the position at which the non-contact setup sensor 33 detects the lower end portion of the setup piece 32, and the position at which the non-contact setup sensor 33 detects the cutting edge of the blade 27 by converting them from angular position θ.

Since the lower end portion of the setup piece 32 is spaced a distance of Q upward from the cutting edge of the blade 27, the setup piece is at a larger angular position accordingly. Because the amount of displacement is already known, a correction may be made according to this amount.

Figure 11:
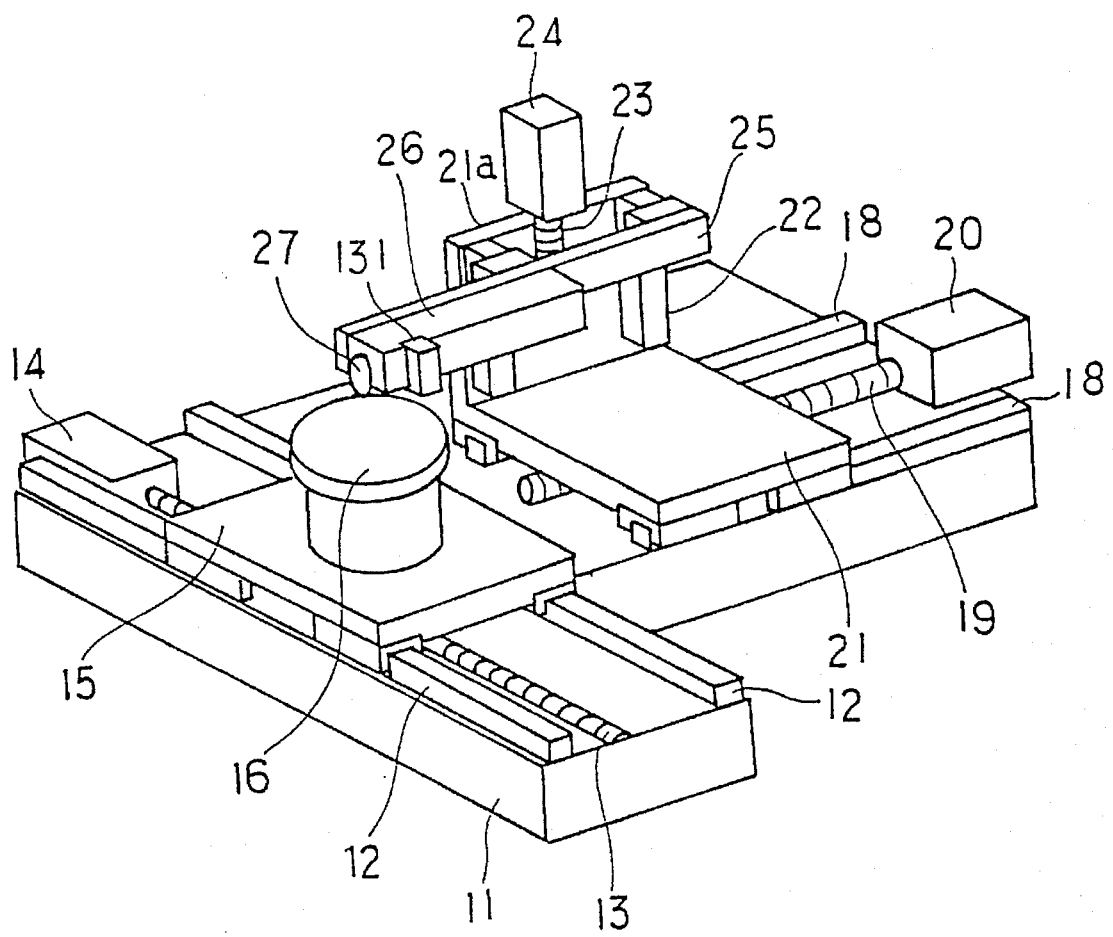
FIG. 11 is a perspective view showing the structure of the main portions of a dicing machine according to a third embodiment of the present invention.

FIG. 11 is a perspective view showing the structure of main portion of a dicing machine according to the third embodiment of the present invention. In this embodiment, some elements which have the same function as that of the first embodiment are designated with the same reference numbers and an explanation thereof is omitted.

As shown in FIG. 11, a dicing machine of this embodiment has a touch switch 131 as a gap detection sensor at a side portion of a spindle 26.

Figure 12:
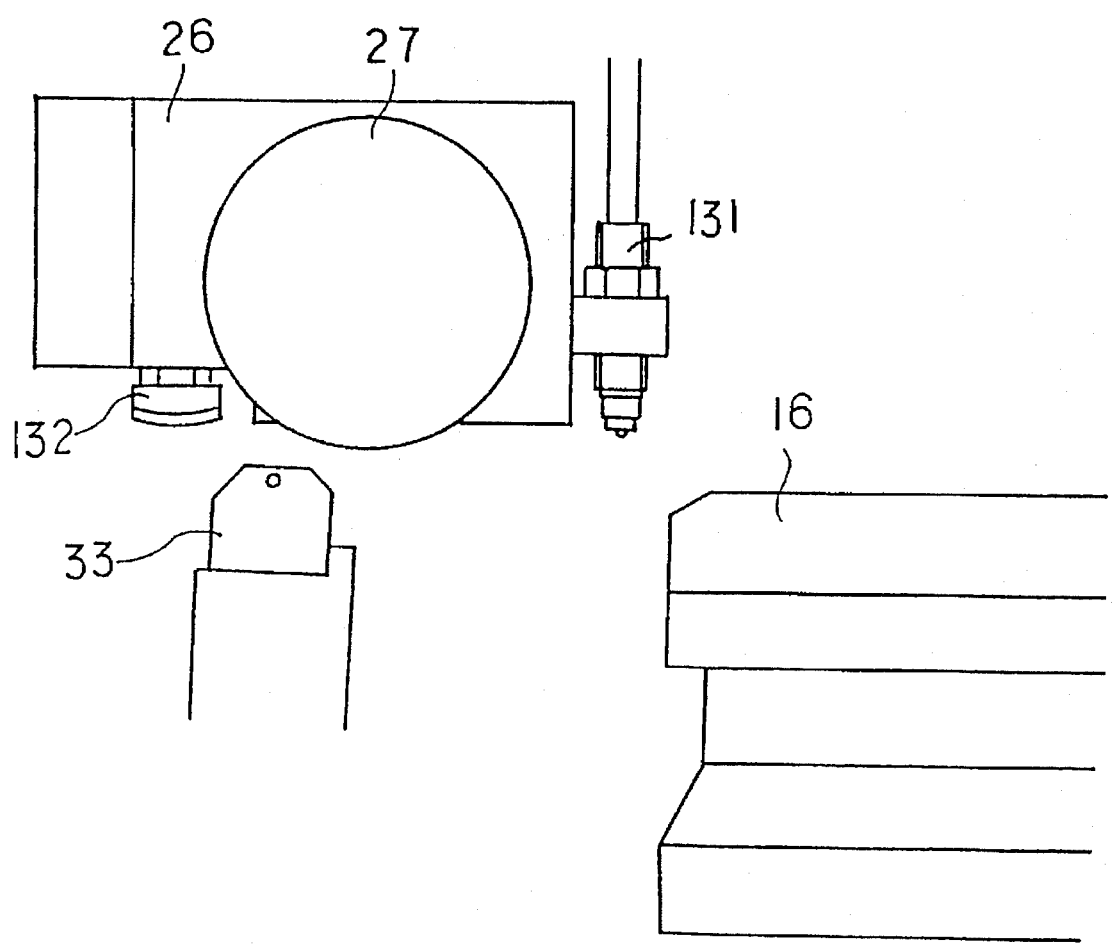
FIG. 12 is a side elevation showing a blade, a laser shield, a touch switch, a chuck table and a non-contact setup sensor which are shown in FIG. 11.

As shown in FIG. 12, the dicing machine of this embodiment installs a laser shield 132 as a detection piece holding a predetermined relative position to a cutting edge of the blade 27 and a touch switch 131 as a gap detection sensor on a side of the spindle 26. The predetermined gap is zero when the touch switch 131 is used. An end surface of the laser shield 132 is formed with a curved surface having the same curvature as an outer periphery of the blade 27. In this embodiment, a bottom surface of the laser shield 132 is disposed to be slightly higher position than the cutting edge of the blade 27. The laser shield 132 is capable of moving up and down by an adjuster which is not shown in FIG. 12, as maintaining a predetermined relative position to the blade 27 and the touch switch 131. In this embodiment, it is defined that the bottom surface of the laser shield 132 and a tip of the touch switch 131 are on the same level.

In the vicinity of the chuck table 16, a non-contact setup sensor 33 is provided at a standard position for positioning the blade 27 at a cutting position of a semiconductor wafer, as the non-contact detection means for detecting the laser shield 132 and the cutting edge of the blade 27 without contacting with them.

Figure 13:
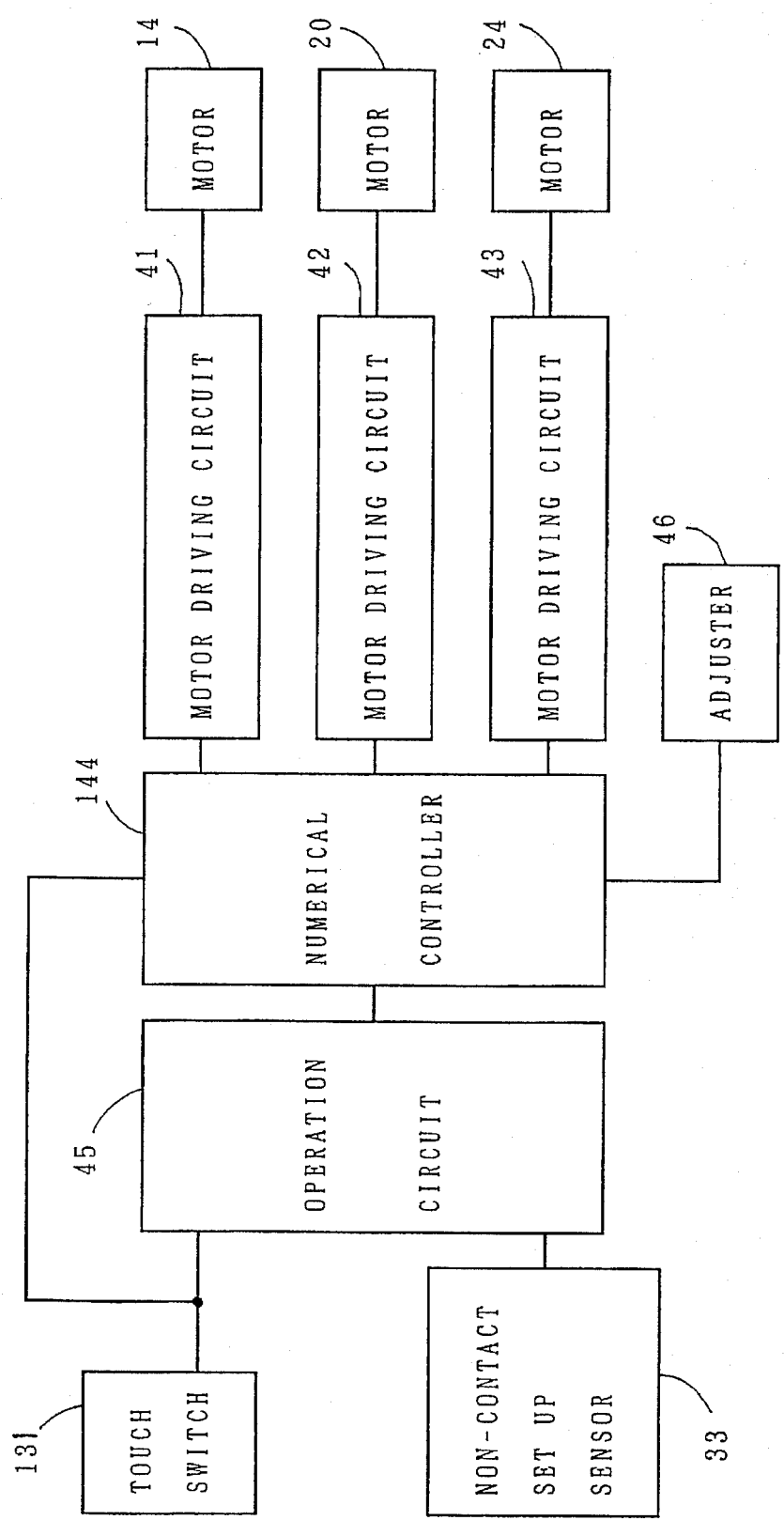
FIG. 13 is a block diagram showing the control system of the dicing machine according to the third embodiment of the present invention.

FIG. 13 is a block diagram showing a structure of the control system of the dicing machine according to this embodiment. The control system of this figure is added an adjuster 46 to that of the first embodiment of FIG. 4 for adjusting the vertical position of the laser shield 132 by moving the laser shield 132 up and down. This adjuster 46, for example, lowers the laser shield 132 and stops lowering when the adjuster 46 feels a certain pressure from the laser shield 132, like a micrometer.

The control system is also provided with a numerical controller 144 for indicating the start of driving of the adjuster 46. A contact detection signal is supplied to the numerical controller 144 when the touch switch 131 detects the contact with the chuck table 16. The numerical controller 144 also controls the motor driving circuits 41, 42 and 43, and recognizes the positions of the chuck table 16 and the blade 27 while moving the chuck table 16 and the blade 27.

Further, the control system installs an operation circuit 45 for calculating the cutting position in accordance with three positions, that is, a position of the touch switch 131 recognized by the numerical controller 144 when the contact between the upper surface of the chuck table 16 and the end of the touch switch 131 is detected by the touch switch 131, a position of the laser shield 132 and a position of the blade 27 which are recognized by the numerical controller 144 when the laser shield 132 and the edge of the blade 27 are detected by the non-contact setup sensor 33.

The movements for setting a cutting position of a semiconductor wafer will be explained by referring to the figures of the dicing machine of this embodiment.

(1) ADJUSTMENT OF THE LASER SHIELD 132

An initial adjustment of the dicing machine is to make the tip of the touch switch 131 coincide with the tip of the laser shield 132 on the same level when the touch switch 131 is turned on, according to the following processes.

First, the laser shield 132 is previously moved to the highest position by the adjuster 46 wherein the tip of the laser shield 132 is positioned higher than the tip of the touch switch 131.

Figure 14:
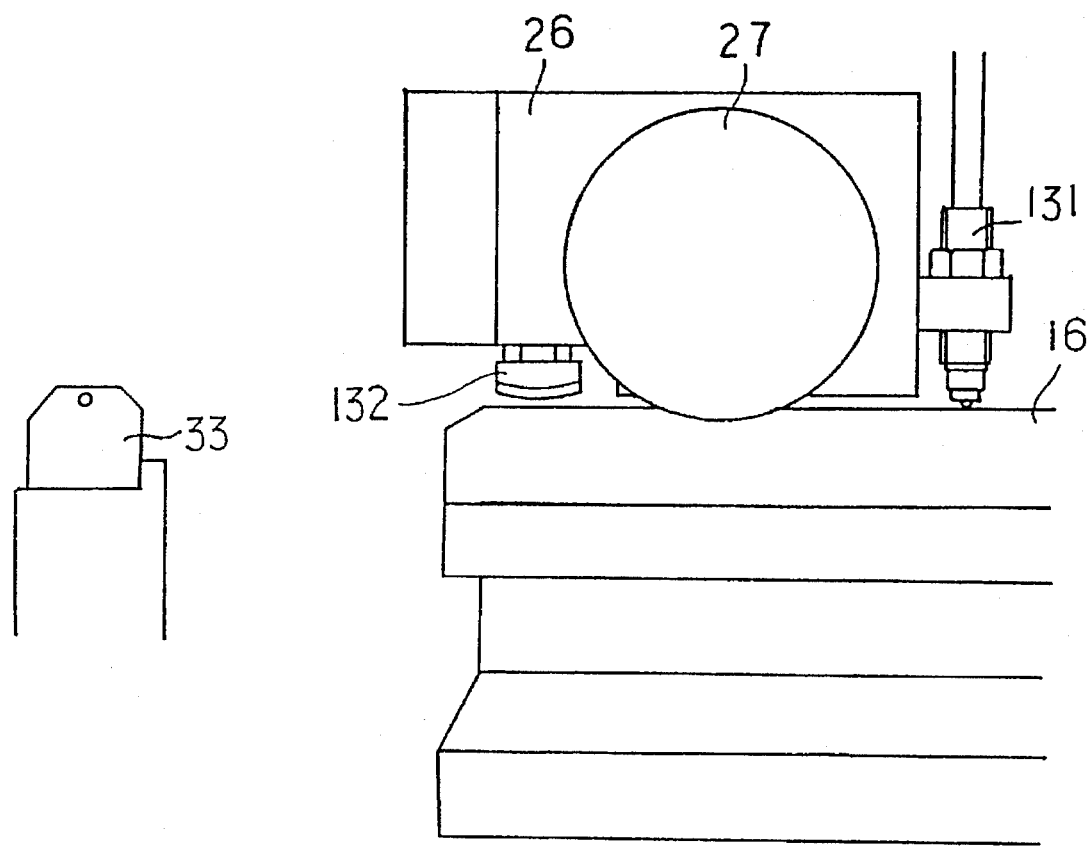
FIG. 14 is a side elevation, illustrating an operation for adjusting the position of the laser shield in the dicing machine according to the third embodiment of the present invention.

Second, as shown in FIG. 14, the motors 14 and 20 are driven by the numerical controller 144 via the motor driving circuits 41 and 42 respectively till the laser shield 132 and the touch switch 131 are moved to positions above the chuck table 16. At the same time, the blade 27 is adjusted to be disposed at a point outside of the chuck table 16 (on nearer side than the chuck table in FIG. 14) by driving the motor 20 via the motor driving circuit 42.

Third, the touch switch 131 is gradually moved down by driving the motor 24 by the numerical controller 144 via the motor driving circuit 43. Further, as soon as the touch switch 131 detects the contact with the chuck table 16, the touch switch 131 transmits a contact detection signal to the numerical controller 144. When the numerical controller 144 receives the detection signal transmitted from the touch switch 131, the numerical controller 144 stops driving of the motor 24, and then orders the adjuster 46 to start driving.

If the starting of driving is indicated from the numerical controller 144 to the adjuster 46, the laser shield 132 is gradually lowered by the adjuster 46. The lowering of the laser shield 132, however, is stopped at a position where the contact pressure between the laser shield 132 and the chuck table 16 is kept constant, and the laser shield 132 is fixed to the position by the adjuster 46.

According to the above explained processes, the height when the touch switch 131 is turned on coincides with the height of the center of the laser shield 132, and the adjustment of positions has been finished.

(2) SETTING A CUTTING POSITION OF THE SEMICONDUCTOR WAFER

Figure 15:
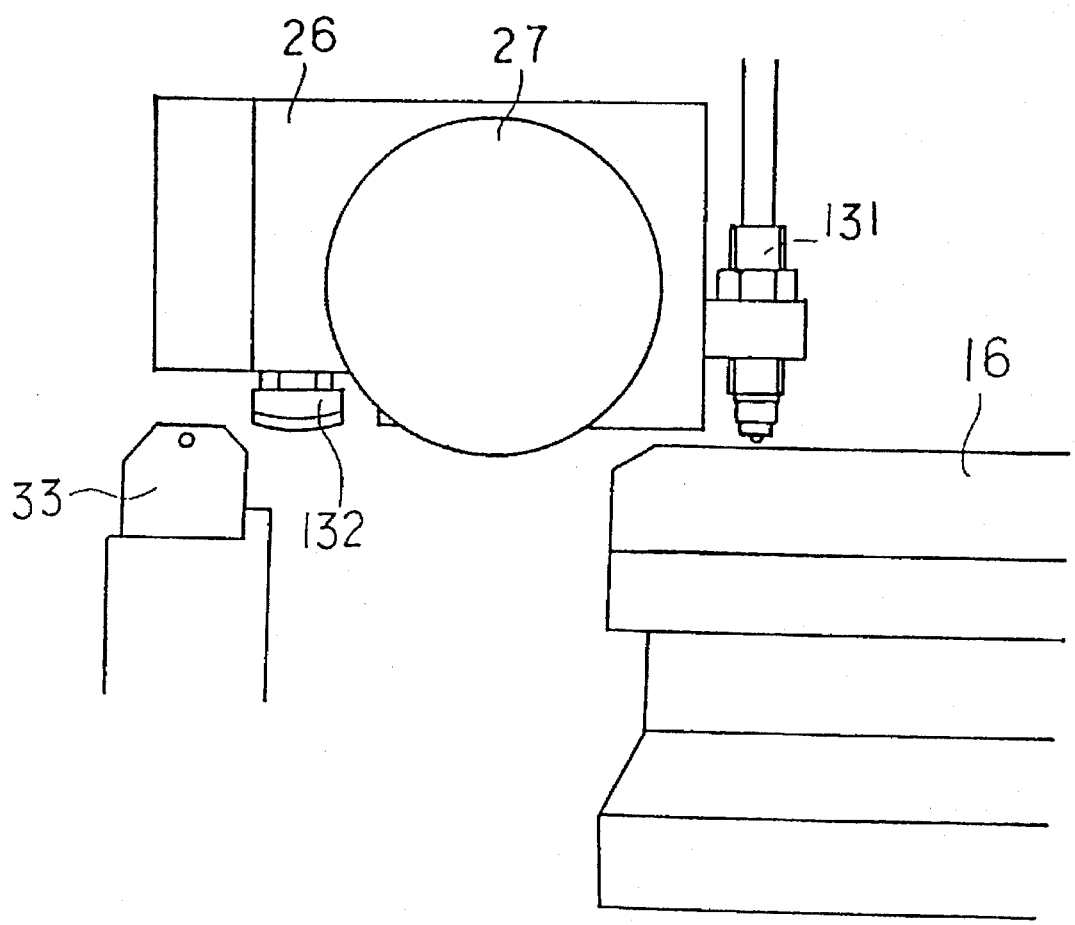
FIG. 15 is a side elevation, illustrating an operation for detecting the contact between the touch switch and the chuck table in the dicing machine according to the third embodiment of the present invention.

First of all, as shown in FIG. 15, the motor 24 is driven by the numerical controller 144 via the motor driving circuit 43, whereby the touch switch 131 is gradually lowered from a position above the chuck table 16. Further, position F of the touch switch 131 when the contact with the chuck table 16 is detected, is recognized by the numerical controller 144.

Figure 16:
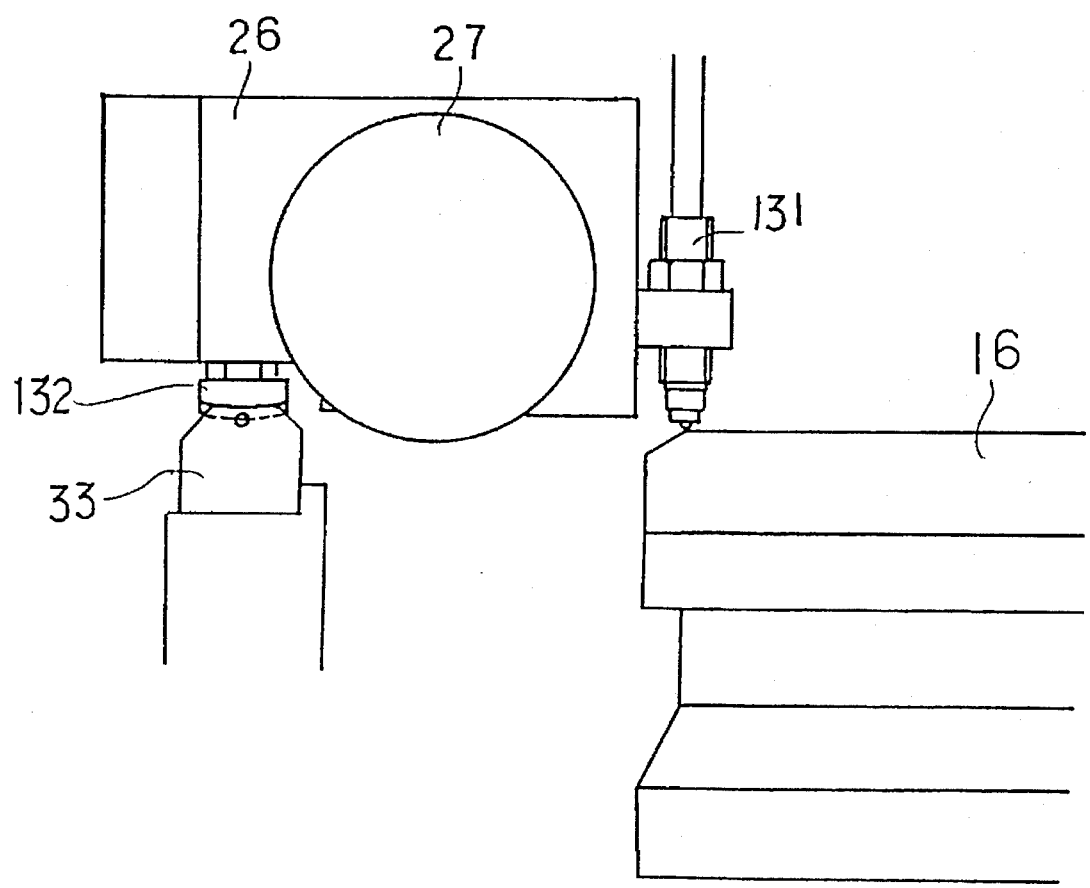
FIG. 16 is a side elevation, illustrating an operation for detecting the bottom part of the laser shield by the non-contact setup sensor in the dicing machine according to the third embodiment of the present invention.

Next, as shown in FIG. 16, the laser shield 132 is gradually lowered from a position above the non-contact setup sensor 33, and position G of the laser shield 132 when the bottom of the laser shield 132 is detected by the non-contact setup sensor 33 is recognized by the numerical controller 144.

Figure 17:
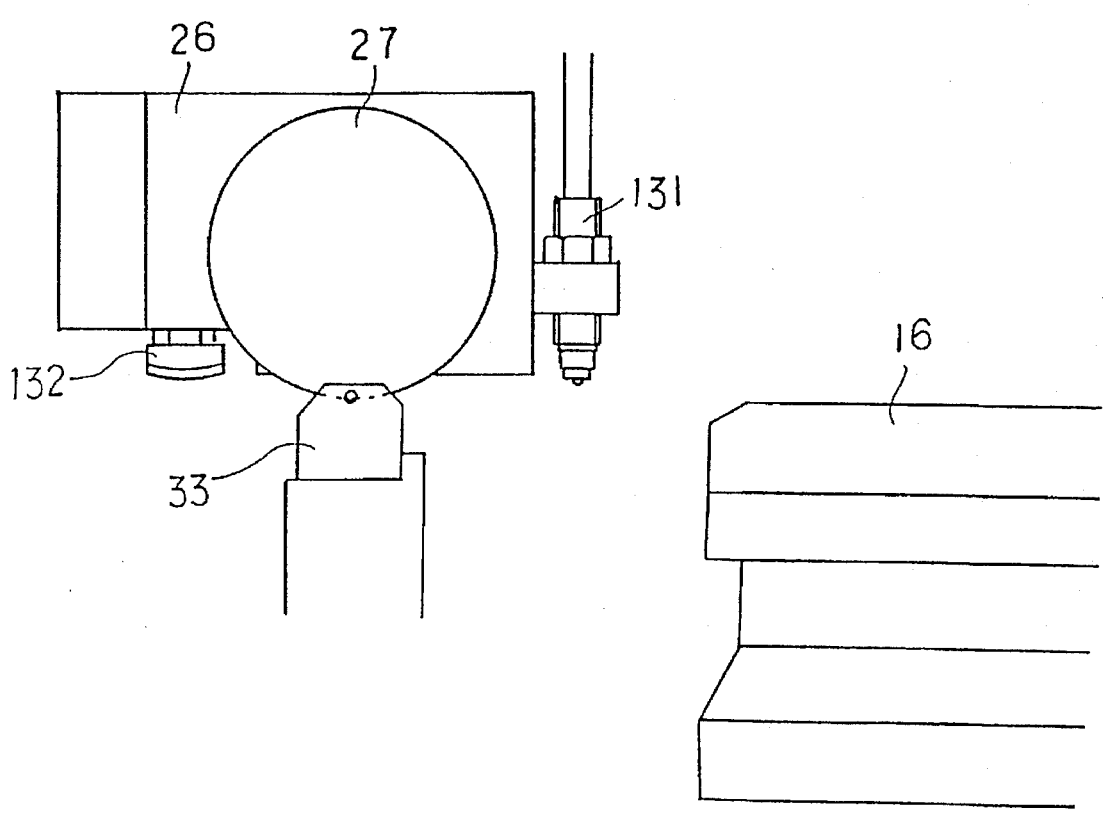
FIG. 17 is a side elevation, illustrating an operation for detecting the edge of the blade by the non-contact setup sensor in the dicing machine according to the third embodiment of the present invention.

Next, as shown in FIG. 17, the blade 27 is gradually lowered from a position above the non-contact setup sensor 33, and position H of the blade 27 when the cutting edge of the blade 27 is detected by the non-contact setup sensor 33 is recognized by the numerical controller 144.

The operation circuit 45 calculates a cutting position of a wafer on the basis of the positions F, G and H which have been recognized by the numerical controller 144 through the above-mentioned processes.

Here, a method of calculating the cutting position of the wafer will be explained by referring to FIG. 18 and FIG.

Figure 18:
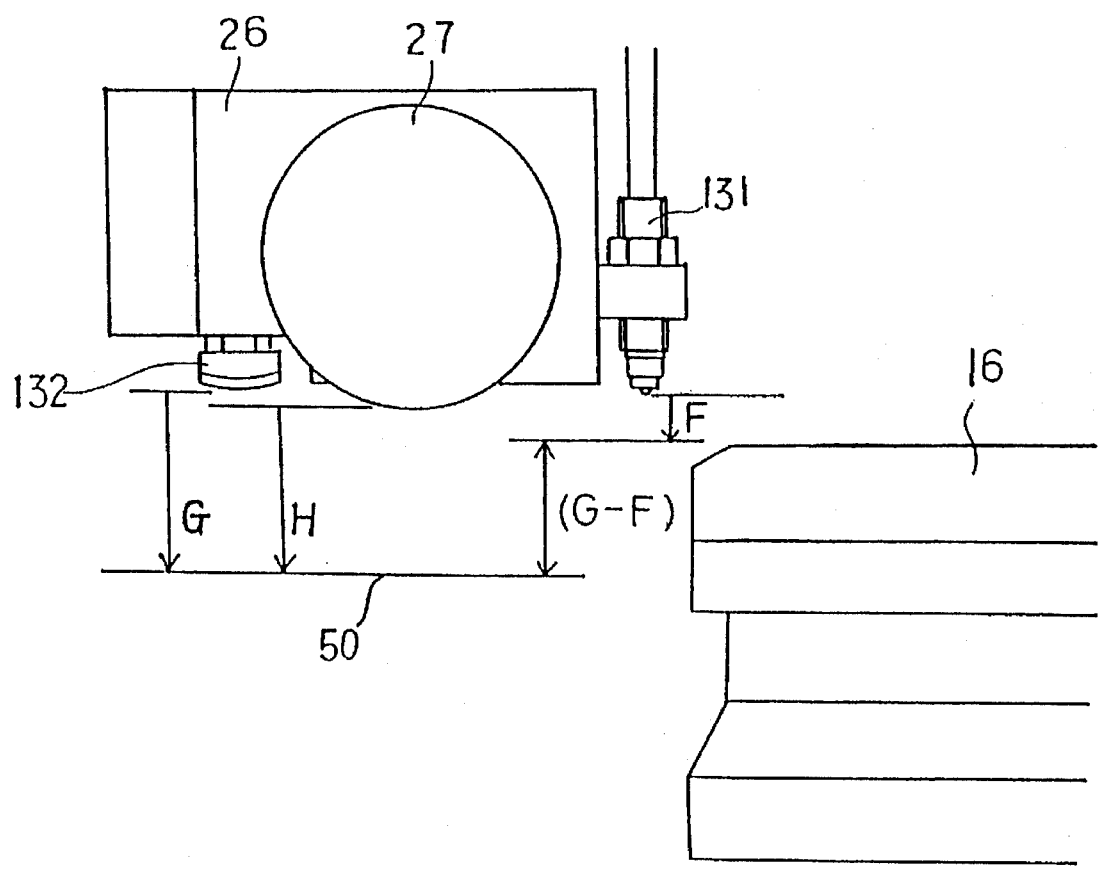
FIG. 18 is a side elevation, illustrating a method of calculating a cutting position in the dicing machine according to the third embodiment of the present invention.

Since the height of the tip of the laser shield 132 coincides with the height when the touch switch 131 is turned on, as shown in FIG. 18, the operation circuit 45 calculates a relative gap (G–F) between the chuck table 16 and the laser light position 50 (standard position) of the non-contact setup sensor 33 in accordance with the position F of the touch switch 131 and the position G of the laser shield 132 which have been recognized by the numerical controller 144.

And further, the operation circuit 45 calculates position H –(G–F) where the blade 27 will be in contact with the chuck table 16 according to the position H of the blade 27 recognized by the numeral controller 144.

As shown in FIG. 9, the thickness of a semiconductor wafer 51 is denoted by C, the thickness of a tape 52 for fixing a semiconductor wafer 51 to a carrier frame is designated by D, and the cutting depth of the blade from the upper surface of the semiconductor wafer 51 to the tape 52 is denoted by E.

In this case, cutting depth U is set by the following equation.

$$U=[H-(G-F)]-(C+D)+E$$

As explained above, according to this embodiment, it is feasible to set the cutting depth U of the semiconductor wafer in spite of the absolute non-contact between the blade 27 and the chuck table 16 by furnishing the touch switch 131, the laser shield 132 and the non-contact setup sensor 33.

Therefore, the blade 27 is not damaged. Consequently, the life of the blade 27 can be extended. Further, as chipping of chips is prevented, the quality of the semiconductor chip is improved.

In the above third embodiment, for example, the touch switch can be used both as a touch switch and a laser shield by forming the contacting part of the touch switch 131 with the chuck table 16 in the same shape as the laser shield 132. Then, the laser shield 132 can be omitted.

The cutting edge of the blade 27 is uneven because of diamond granules, but the end part of the laser shield 132 is even. Further, the blade 27 is rotated, but the laser shield 132 is fixed. These differences of situations may bring about a slight possibility that two positions detected by the non-contact setup sensor 33 are different. Hence, the position of the end part of the laser shield 132, which is detected by the non-contact setup sensor 33, may not coincide with the position of the edge of the blade 27 which is also detected by the non-contact setup sensor 33. To solve the problem, another method can be proposed. Hence, the positions of the end of the laser shield 132 and the cutting edge of the blade 27 are previously measured by the non-contact set up sensor 33 on experiment. The true positions of them are measured by some other means. Further, the next step calculates differences between the positions measured by the non-contact setup sensor 33 and the true positions. When the dicing machine is actually used, the position is corrected by modifying the positions by the differences.

As explained thus far, according to the present invention, a cutting position of the semiconductor wafer can be set without bringing the blade into contact with the machining table. Namely, the gap detection means detects a predetermined gap between the upper surface of the machining table and the gap detection means. The position of the gap detection means, at this time, can be recognized by the position controlling means. The non-contact detection means detects the position of the cutting edge of the blade and the gap detection means in the condition of non-contact with the machining table. The position control means recognizes the positions of the gap detection means and the cutting edge of the blade. The arithmetic operation means calculates the cutting position in accordance with the positions recognized by the position control means. As a result, the blade suffers no damage. Therefore the life of the blade can be prolonged, chipping of chips is fully prevented, and the quality of chips is so much improved.

What is claimed is:

1. A dicing machine with non-contact setup function comprising:

a machining table for holding a semiconductor wafer;

a cutting blade for cutting the semiconductor wafer held by the machining table;

gap detection means for detecting a gap between the cutting blade and an upper surface of the machining table to be in a predetermined value;

position controlling means for moving the cutting blade and the gap detection means in a vertical direction, and for recognizing their positions;

non-contact detection means for detecting the gap detection means and a cutting edge of the cutting blade in a condition of non-contact, the non-contact detection means being placed at a standard position for determining the cutting blade position at a cutting position of the semiconductor wafer; and arithmetic operation means for calculating the cutting position of the semiconductor wafer in accordance with a position recognized by the position controlling means when a predetermined gap between the cutting blade and the upper surface of the machining table is detected by the gap detection means, and also from positions recognized by the position controlling means when the gap detection means and the cutting edge of the cutting blade are detected by the non-contact detection means.

2. A dicing machine according to claim 1; wherein the gap detection means comprises a machining table reference surface having a given positional relation with the surface of the machining table;

a contact piece having a given positional relation with the cutting edge of the cutting blade; and contact detection means for detecting contact between the machining table reference surface and the contact piece;

wherein the arithmetic operation means calculates the cutting position from a position recognized by the position controlling means when the contact detection means detects contact between the machining table reference surface and the contact piece, and also from positions recognized by the position control means when the non-contact detection means detects the contact piece and the cutting edge of the cutting blade.

3. A dicing machine according to claim 1; wherein the gap detection means comprises a contact switch for detecting contact thereof with the machining table; and a detection piece positioned in a predetermined relationship with the contact switch and the edge of the cutting blade;

wherein the arithmetic operation means calculates the cutting position from a position recognized by the position control means when the contact switch detects a predetermined gap between the cutting edge of the cutting blade and the surface of the machining table, and also from positions recognized by the position control means when the non-contact detection means detects the detection piece and the cutting edge of the cutting blade.

4. A dicing machine according to claim 2; wherein an end surface of the contact piece is formed so as to have the same curvature as an outer periphery of the cutting blade.

5. A dicing machine according to claim 3; wherein an end surface of the detection piece is formed so as to have the same curvature as an outer periphery of the cutting blade.

6. A dicing machine according to claim 3; wherein a tip part of the contact switch is used as the detection piece.

7. A dicing machine comprising:
   a machining table having a surface for supporting a semiconductor wafer;
   a cutting blade for cutting the semiconductor wafer supported by the machining table;
   a gap detection device for detecting a preselected gap between the cutting blade and the surface of the machining table;
   a position control device for moving the cutting blade and the gap detection device in a vertical direction and for recognizing the positions thereof;
   a non-contact detection device for detecting non-contact between the gap detection device and a cutting edge of the cutting blade, the non-contact detection device being placed at a standard position for determining the cutting blade position at a cutting position of the semiconductor wafer; and
   an arithmetic operation device for calculating the cutting position of the semiconductor wafer in accordance with a position recognized by the position control device when a predetermined gap between the cutting blade and the upper surface of the machining table is detected by the gap detection device, and in accordance with positions recognized by the position control device when the gap detection device and the cutting edge of the cutting blade are detected by the non-contact detection device.

8. A dicing machine according to claim 7; wherein the gap detection device comprises a machining table reference surface having a given positional relation with the surface of the machining table, a contact piece having a given positional relation with the cutting edge of the cutting blade, and a contact detection device for detecting contact between the machining table reference surface and the contact piece.

9. A dicing machine according to claim 8; wherein the arithmetic operation device is operative to calculate the cutting position from a position recognized by the position control device when the contact detection device detects contact between the machining table reference surface and the contact piece, and from positions recognized by the position control device when the non-contact detection device detects predetermined positions of the contact piece and the cutting edge of the cutting blade.

10. A dicing machine according to claim 8; wherein the machining table reference surface is positioned below the surface of the machining table supporting the semiconductor wafer.

11. A dicing machine according to claim 10; wherein the machining table reference surface is made of metal.

12. A dicing machine according to claim 8; wherein a bottom surface of the contact piece is positioned above the cutting edge of the cutting blade.

13. A dicing machine according to claim 12; wherein the bottom surface of the contact piece is made of metal.

14. A dicing machine according to claim 8; wherein an end surface of the contact piece has the same curvature as an outer periphery of the cutting blade.

15. A dicing machine according to claim 7; wherein the gap detection device comprises a contact switch for detecting contact thereof with the machining table, and a detection piece positioned in a predetermined relationship with the contact switch and the edge of the cutting blade.

16. A dicing machine according to claim 15; wherein the arithmetic operation device is operative to calculate the cutting position from a position recognized by the position control device when the contact switch detects a predetermined gap between the cutting edge of the cutting blade and the surface of the machining table, and from positions recognized by the position control device when the non-contact detection device detects predetermined positions of the detection piece and the cutting edge of the cutting blade.

17. A dicing machine according to claim 15; wherein an end surface of the detection piece has the same curvature as an outer periphery of the cutting blade.

18. A dicing machine according to claim 15; wherein the detection piece comprises a portion of the contact switch.

19. A dicing machine comprising:
   a work table having a surface for supporting a workpiece;
   a machining tool for machining he workpiece;
   a gap detection device for detecting a preselected gap between the machining tool and the surface of the work table;
   a non-contact detection device for detecting a non-contact condition between the gap detection device and a machining portion of the machining tool; and
   a calculating device for calculating a machining position of the workpiece when the preselected gap between the machining tool and the surface of the work table is detected by the gap detection device and when the non-contact condition of the gap detection device and the machining portion of the machining tool is detected by the non-contact detection device.

20. A dicing machine according to claim 19; further comprising a control device for moving the machining tool and the gap detection device and for detecting their positions; and wherein the calculating device calculates the machining position of the workpiece in accordance with the positions of the machining tool and the gap detection device detected by the control device.

21. A dicing machine according to claim 20; wherein the gap detection device comprises a work table reference surface having a preselected positional relation with the surface of the work table, a contact piece having a preselected positional relation with the machining portion of the machining tool, and a contact detection device for detecting contact between the work table reference surface and the contact piece.

22. A dicing machine according to claim 21; wherein an end surface of the contact piece has the same curvature as an outer periphery of the machining tool.

23. A dicing machine according to claim 20; wherein the gap detection device comprises a contact switch for detecting contact thereof with the work table, and a detection piece positioned in a preselected relationship with the contact switch and the machining portion of the machining element.

24. A dicing machine according to claim 23; wherein an end surface of the detection piece has the same curvature as an outer periphery of the processing element.

25. A dicing machine according to claim 23; wherein the detection piece comprises a portion of the contact switch.

* * * * *